US005504556A

United States Patent [19]

Umeda et al.

[11] Patent Number: 5,504,556

[45] Date of Patent: Apr. 2, 1996

[54] ELECTROSTATIC RECORDING APPARATUS, METHOD OF CONTROLLING THE APPARATUS, AND METHOD OF EVALUATING LIFE OF PHOTOCONDUCTIVE MEMBER OF ELECTROSTATIC RECORDING APPARATUS

[75] Inventors: Takao Umeda, Mito; Toru Miyasaka, Hitachi; Osamu Namikawa, Katsuta; Isamu Komatsu, Takahagi, all of Japan

[73] Assignees: Hitachi, Ltd.; Hitachi Koki Co., Ltd., both of Tokyo, Japan

[21] Appl. No.: 331,097

[22] Filed: Oct. 28, 1994

Related U.S. Application Data

[63] Continuation of Ser. No. 827,939, Jan. 29, 1992, Pat. No. 5,404,201, which is a continuation of Ser. No. 325,386, Mar. 20, 1989, Pat. No. 5,138,380.

[30] Foreign Application Priority Data

Mar. 22, 1988 [JP] Japan .................................... 63-65636
Dec. 6, 1988 [JP] Japan .................................. 63-306844

[51] Int. Cl.[6] ............................ G03G 21/00; G01N 27/60
[52] U.S. Cl. ............................ 355/205; 355/216; 324/456
[58] Field of Search .................................... 355/203, 205, 355/206, 209, 216, 219; 324/456, 452

[56] References Cited

U.S. PATENT DOCUMENTS 5,101,159 3/1992 Bossard et al. .......................... 324/456
5,119,030 6/1992 Bossard et al. .......................... 324/456

*Primary Examiner*—R. L. Moses
*Attorney, Agent, or Firm*—Antonelli, Terry, Stout & Kraus

[57] ABSTRACT

Device and method for evaluating a defect of a photoconductive body in which the position and number of defects such as pinholes in the photoconductive body are detected. The defect evaluation device includes a charger, a photoconductive body moving mechanism, a surface potential sensor, a position sensor detecting the position of a cap member on the photoconductive body and an arithmetic operation unit and a diagnosing device. A rotating photoconductive drum is charged by the charger, and the charged surface potential of the drum is measured by the surface potential sensor. The measured position is determined by the position sensor. The measured values by the surface potential sensor is subjected to differentiation processing by the arithmetic operation unit to determine a differentiation value dV/dt of the surface potential V of the photoconductive body with respect to time t. The diagnosing device detects a position on the photoconductive body whose surface potential abruptly changes, from the dV/dt to thereby determine a fatal detect.

18 Claims, 11 Drawing Sheets

ELECTROSTATIC RECORDING APPARATUS, METHOD OF CONTROLLING THE APPARATUS, AND METHOD OF EVALUATING LIFE OF PHOTOCONDUCTIVE MEMBER OF ELECTROSTATIC RECORDING APPARATUS

This application is a Continuation of application Ser. No. 07/827,939, filed Jan. 29, 1992, now U.S. Pat. No. 5,404,201 which is a continuation of application Ser. No. 07/325,386, filed Mar. 20, 1989, now U.S. Pat. No. 5,138,380, issued Aug. 11, 1992.

BACKGROUND OF THE INVENTION

The present invention relates to an electrostatic recording apparatus, and in particular, to a method of controlling a surface potential of a photoconductive member or body and a method of evaluating a life thereof by detecting a surface state of the photoconductive member by use of surface potential detect means and to an electrostatic recording apparatus suitable for the methods above.

In the electrostatic recording apparatus, in general, a photoconductive member of body is charged with electricity so as to effect an exposure of an optical image to produce an electrostatic latent image, which is then developed to obtain a toner image on the photoconductive member. Thereafter, the toner image is transcribed onto a sheet of paper so as to fix the image on the sheet, thereby achieving a recording operation. In this process, the amount of electricity charged on the photoconductive member, namely, the level of an electric potential of the member determines the effect of the electrostatic recording process, and hence there is disposed a control mechanism associated therewith.

There has been filed a patent application (JP-61-56514corresponding to JP-A-54-37760) in which a portion of a photoconductive sheet is rolled on a photoconductive drum such that a utilization portion of the sheet is changed by winding up the sheet and in which for the photoconductive sheet of the winding type, a cap portion of an opening disposed on the drum to pass the photoconductive sheet in the forward and backward directions is set to a ground potential in any situation or the cap potential is set to the ground potential when the cap portion is located at a position opposing to surface potential detect means. An object of this system is that a zero potential correction is conducted on the surface potential detect means when the surface potential detect means passes the cap portion. Another object thereof is to measure the surface potential of the photoconductive member by use of the surface potential detect means so as to control a charging device or charger.

In either case, the potential of the cap portion is open or is set to the ground potential.

On the other hand, the JP-A-58-4172 describes a system in which when the cap portion is set to a location opposing to the surface potential detect means, a calibration voltage is connected to the cap portion so as to calibrate the surface potential detect means, or the cap portion is connected to an ammeter to measure a corona current so as to adjust an output from the power source of the charging device.

According to the technology described above, the cap portion (reference potential measure section) disposed in a portion of the surface of the photoconductive member or body is employed as an electrode to calibrate the surface potential detect means or as an electrode to detect the corona current of the charging device.

SUMMARY OF THE INVENTION

The present invention is devised to further effectively utilize the cap portion and has the following objects.

An object of the present invention is to provide surface potential control means in which a surface potential of the reference potential section and a surface potential of the charge receiving surface are comparatively measured such that the charging device is controlled to equalize the potential for the charge receiving surface and for the cap portion, thereby developing a high reliability without necessarily requiring a calibration of the surface potential detect means.

Another object of the present invention is that when the reference potential section passes a developer, the potential of the reference potential measure section is charged with electricity depending on a develop condition (normal or reverse development for a positive or negative image) so as to prevent a toner from fixing onto the reference potential measure section and hence from being transcribed onto an area in which the toner is unnecessary.

In addition, still another object of the present invention is that the surface potential or current is measured on the photoconductive body after the charging operation or after the exposure effected thereon so as to evaluate a life of the photoconductive body, thereby providing a method of determining a period of time for replacing the photoconductive body.

Furthermore, another important object of the present invention is to provide a system concept in a system configuration combined with information processing apparatuses such as a computer and a personal computer in which the electrostatic recording apparatus is not limited only to a receiver of print data such that data indicating a state of the photoconductive body surface and data to be used to evaluate the picture quality are supplied from the electrostatic recording apparatus to the information processing apparatus so as to effect an interactive processing in which, for example, the data thus received is processed and is then fed back to the electrostatic recording apparatus.

Next, a brief description will be given of the summary of the basic principle of the present invention devised in order to achieve the objects above.

In a portion of the surface of a drum including a photoconductive body, there is disposed an area free from the transcribe operation, and there is disposed a member to supply the area with a voltage directly or indirectly from an external power supply so as to set the portion to a predetermined potential, and then a reference potential measure section is configured on the surface of the rotating drum. The method to indirectly supply the voltage here means a method to supply electric charge by use of a charging device.

In this fashion, by arranging the surface potential detect means on an upper portion of the photoconductive drum, the surface potential detect means can measure during the rotation of the photoconductive drum the potential of the reference potential measure section and that of the charge receiving surface at a predetermined interval or cycle, thereby achieving the objects above. FIGS. 1A and 1B are explanatory diagrams useful to explain the operation above. As shown in FIG. 1A, a photoconductive drum is constituted such that a portion of a photoconductive sheet 4 is drawn from a stock roll 1 through an opening 5 disposed in a portion of a drum tube 3 toward the outside so as to be rolled on the drum tube 3; thereafter, the sheet 4 is again fed from the opening 5 into the inside so as to be rolled on a takeup roll 2, and the opening 5 is to be covered by means of a cap 6. The potential of the cap 6 is set to $V_S$. In this configuration, there can be disposed a reference potential area in a portion of the surface of the photoconductive drum. In the example of FIG. 1A, the cap 6 constitutes the reference potential measure section.

The potential of the reference potential measure section is set to a value to be taken by the potential on the drum surface (the charge receiving surface such that during the rotation of the drum, the surface potential detect means detects the potential of the reference potential measure section and that of the charge receiving surface so as to obtain a difference therebetween, and the operation of the charging device is adjusted to minimize the difference in potential so as to vary the potential of the charge receiving surface. In this situation, the voltage detection error can be regarded as constant for the surface potential detect means during a rotation of the drum; in consequence, a highly precise surface potential control can be accomplished without frequently achieving the calibration of the surface potential detect means. In addition, when the potential of the reference potential measure section is appropriately set depending on the develop condition, it is possible that the toner is prevented from fixing onto the portion when the portion passes through the developer disposed over the peripheral region of the drum. Furthermore, the surface potential detect means detects the potential of the reference potential measure section and that of the charge receiving surface so as to check for the difference therebetween and distributions thereof, and hence it is possible to recognize a great change or an irregular change in the potential due to deterioration of the charge receiving surface, which enables the deterioration of the charge receiving surface, namely, the photoconductive body to be detected and which hence enables the life of the photoconductive body to be evaluated.

BRIEF DESCRIPTION OF THE DRAWINGS

These and other objects and advantages of the present invention will become apparent by reference to the following description and accompanying drawings wherein:

FIGS. 1A and 1B are schematic diagrams showing an embodiment wherein there is shown the basic operation principle according to the present invention in which FIG. 1A shows an electrostatic recording apparatus to which the present invention is applied and FIG. 1B shows a control system diagram associated therewith;

DESCRIPTION OF THE PREFERRED EMBODIMENTS

First, in order to more clearly explain the present invention, description will be given of the operation of an electrostatic recording apparatus in a case to which the present invention is not applied.

Figure 1A:
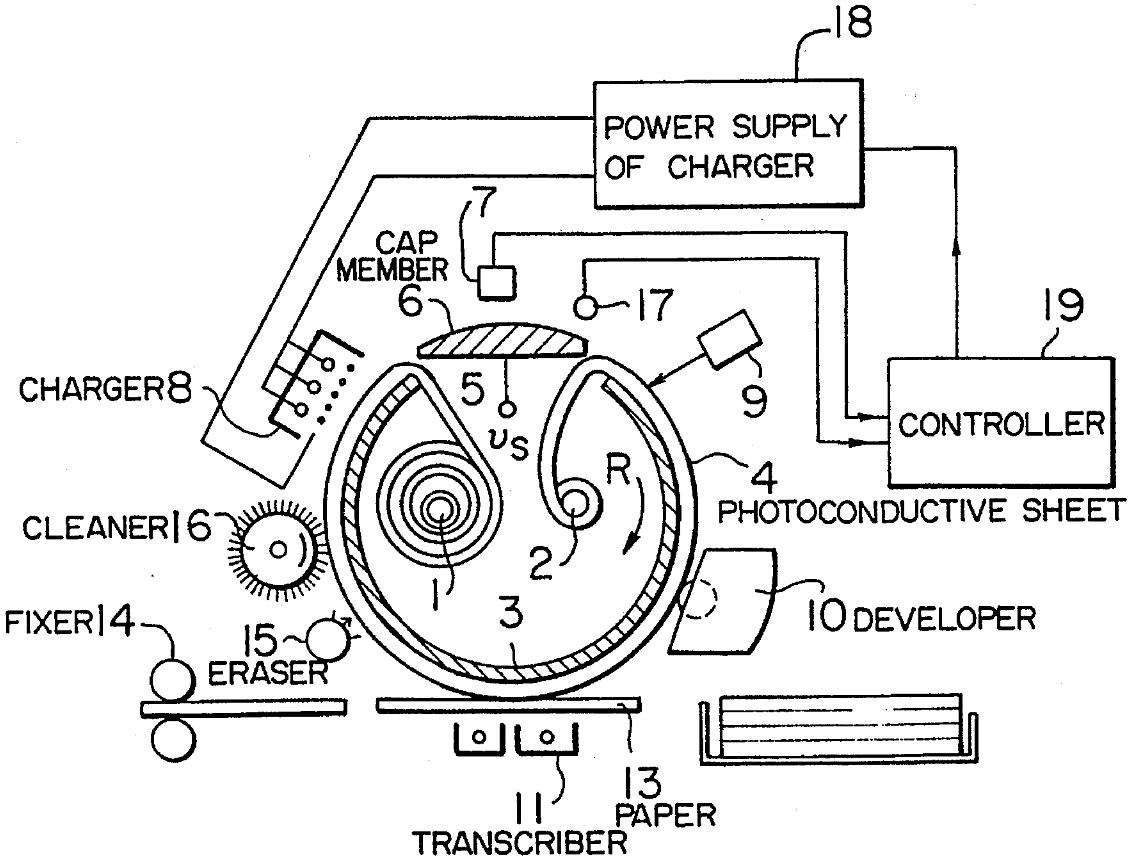
Figure 1B:
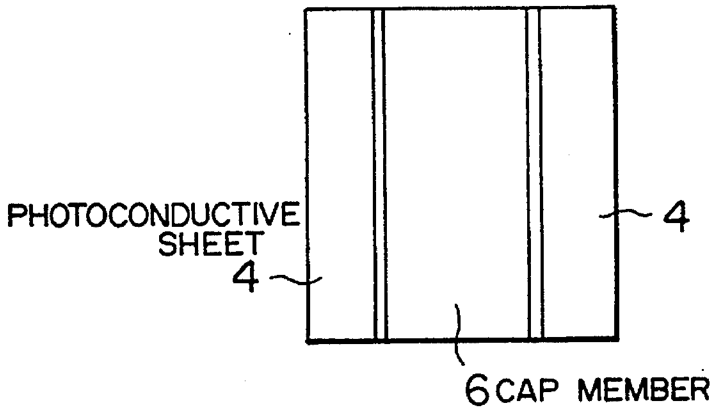

In FIGS. 1A and 1B, a drum tube 3 is covered by a sheet 4 of a photoconductive material wound thereon so as to constitute a photoconductive drum and turns in the direction of the arc arrow R. An electric charge receiving surface of the photoconductive drum is charged by means of a charger 8, and then an optical system 9 effects an exposure of an optical image so as to form a latent image thereon. Thereafter, the latent image is developed by a developer 10 to be a toner image as a visible image, which is then transcribed onto a sheet of paper 13 by use of a transcriber 11. The transcribed toner image is fixed onto the sheet 13 by means of a fixer 14 and the sheet 13 is ejected from the apparatus. On the other hand, the residual potential of the photoconductive drum is removed by an eraser 15 and then the remaining toner is cleaned up from the surface of the photoconductive body by means of a cleaner 16; thereafter, the process steps are repeatedly accomplished beginning from the charging step.

FIGS. 1A and 1B show an embodiment according to the present invention. In the configuration of FIG. 1A, a portion of the photoconductive sheet 4 is drawn from a stock roll 1 to the outside through an opening 5 disposed in a portion of the drum tube 3 so as to be wound on the drum tube 3; thereafter, the sheet 4 is again fed through the opening 5 to the inside so as to be wound on a takeup reel 2, thereby constituting the photoconductive drum. The opening 5 is covered by means of a cap 6 insulated with respect to the drum tube 3. This cap 6 is employed as a reference potential measure section (cap) formed in an area of the surface of the photoconductive drum.

The photoconductive sheet 4, namely, the electric charge receiving surface is charged by means of a charger 8, and then an optical system 9 effects an exposure of an optical image so as to form a latent image thereon. Thereafter, the latent image is developed by a developer 10 to be a toner image as a visible image, which is then transcribed onto a sheet of paper 13 by use of a transcriber 11. The transcribed toner image is fixed onto the sheet 13 by means of a fixer 14 and the sheet 13 is ejected from the apparatus. On the other hand, the residual potential of the photoconductive drum is removed by an eraser 15 and then the remaining toner is cleaned up from the surface of the photoconductive body by means of a cleaner 16; thereafter, the process steps are repeatedly accomplished beginning from the charging step.

In FIG. 1A, reference numerals 17, 18, and 19 indicate a sensor to detect a position of the cap 6, a power source of the charger 14, and a control circuit thereof, respectively.

Figure 2:
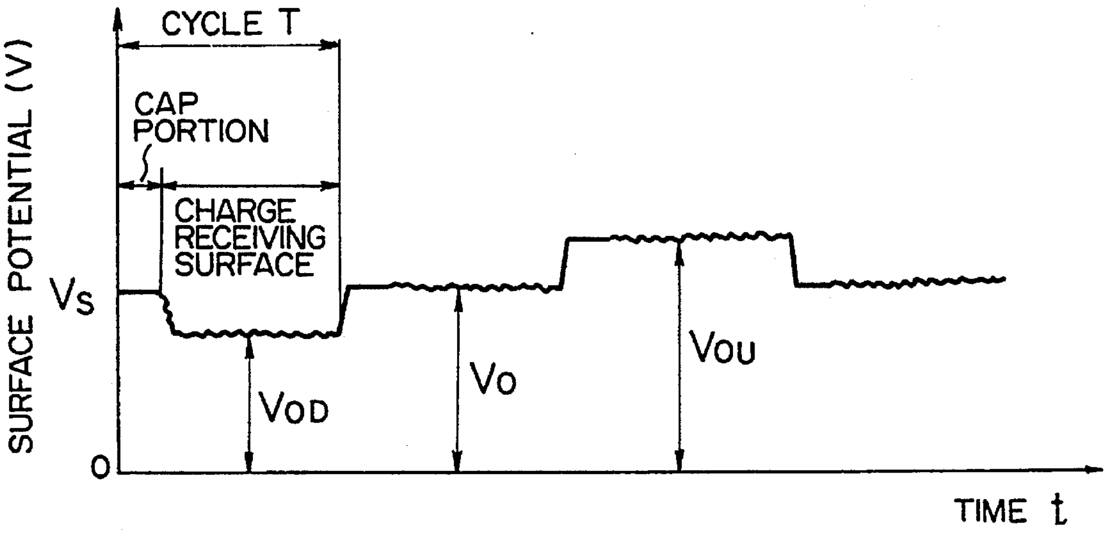
FIG. 2 is a diagram schematically showing, like FIGS. 1A and 1B, another embodiment for explaining the basic operation principle according to the present invention in which there is shown a variation with respect to time of the surface potential of a surface of a photoconductive body in an electrostatic recording apparatus to which the present invention is applied.

Next, description will be given of an operation in a case where the reference potential measure section above is provided. FIG. 1B is a plan view showing portions centered on the cap 6 disposed as a reference potential measure section. FIG. 2 shows a variation in time of an output of a measured potential on the surface of the photoconductive drum by use of the surface potential detect means 7 disposed above the photoconductive drum. FIG. 2 shows a characteristic developed in a state where the surface of the photoconductive body is charged by means of the charger 8. The potential $V_S$ of the cap 6 can be arbitrarily set by use of an external power supply. Assume now that the voltage is set to a potential $V_S$ determined by a material of the charge receiving section (photoconductive body). The potential of the surface of the charge receiving body varies depending on conditions such as charge conditions of the charger (the charge voltage, the grid voltage, etc.) and the degree of wear of the charge receiving surface. If the charge conditions are not appropriate, the potential $V_O$ of the charge receiving surface becomes to be lower or higher than the potential $V_S$. In consequence, the value of $V_O$ is to be controlled so as to take a value in the proximity of $V_S$.

In this constitution, since the reference potential measure section including the cap 6 is disposed on a surface of the photoconductive body, by controlling the charger such that during the rotation of the drum, the output from the surface potential detect means takes substantially the same value on the photoconductive drum surface as the potential of the reference potential measure section, thereby controlling the potential of the surface of the photoconductive body to be an appropriate value.

As shown in FIG. 2, through a comparison with the reference potential measure section, relationships with respect to the level of the voltage are determined so as to effect a correction in the subsequent cycle.

According to this configuration, the surface potential detect means need not measure the absolute potential on the surface of the photoconductive drum, that is, without achieving an absolute calibration of the surface potential detect means, the potential on the surface of the photoconductive body can be controlled with a high precision.

In the configuration of FIGS. 1A and 1B, there is employed the position sensor 17 to determine the position of the cap. In consequence, it may also be considered that the cap need not be limited to the reference value, namely, a sense operation may be effected on a portion of the photoconductive body by use of the position sensor so as to measure the surface potential, which is then used as a reference value for a comparison with a potential of another section.

The photoconductive body is deteriorated in a long-term operation. The deterioration includes electric, mechanical, and chemical deterioration.

That is, when the photoconductive body is exposed to a corona discharge, the surface of the photoconductive body is oxidized in a lapse of time and hence the value of the surface resistance is lowered.

Furthermore, when defects such as a pinhole existing in the surface of the photoconductive body are exposed to the corona discharge, the volume resistivity is locally decreased. These phenomena cause the electric deterioration.

As a chemical deterioration, there can be considered a deterioration caused, for example, by ozone and $NO_3$.

In addition, the mechanical deterioration is caused by a developing material (primarily, a carrier) fixed onto the surface of the photoconductive drum in the development and a damage effected by the cleaner. In actuality, there appears a composite deterioration associated with a combination of these phenomena.

When the photoconductive body undergoes a deterioration, the smoothness of the surface thereof is lost and hence the surface potential distribution is not uniform after the charge operation, namely, there randomly appear locations where the surface potential is locally high and low, respectively (local variations of the surface potential of the photoconductive body). In such a situation, the adverse condition cannot be coped with only by voltage control of the charger, namely, it is necessary to replace the photoconductive body.

For the reasons above, there is provided control means such that the surface potential distribution on the charge receiving surface is measured by use of the surface potential detect means so as to compare the distribution state with the reference value, thereby achieving the life evaluation of the photoconductive body.

In addition, during the drum rotation, the potential is measured on the reference potential measure section and the charge receiving surface by use of the surface potential detect means to obtain the difference between the measured voltages such that the operation of the charger is adjusted to minimize the difference in potential so as to change the potential of the charge receiving surface. In this situation, the voltage detection error of the surface potential detect means can be regarded as constant during a rotation of the drum; in consequence, without frequently effecting the calibration of the surface potential detect means, the surface potential can be controlled with a high precision. Furthermore, when the potential of the reference potential measure section is appropriately set depending on the develop conditions, it is possible to prevent the toner from fixing onto the portion when the portion passes the developer disposed over the periphery of the drum. In addition, the surface potential detect means measures the potential on the reference potential measure section and on the charge receiving surface so as to check for the difference between the potential values and the distributions thereof, which enables a great change and an irregular variation in the potential due to the deterioration of the charge receiving surface to be recognized and which hence enables the deterioration of the charge receiving surface, namely, the photoconductive body, to be detected.

Next, referring to FIGS. 3A to 3K, description will be given of another embodiment of an apparatus according to the present invention.

Figure 3A:
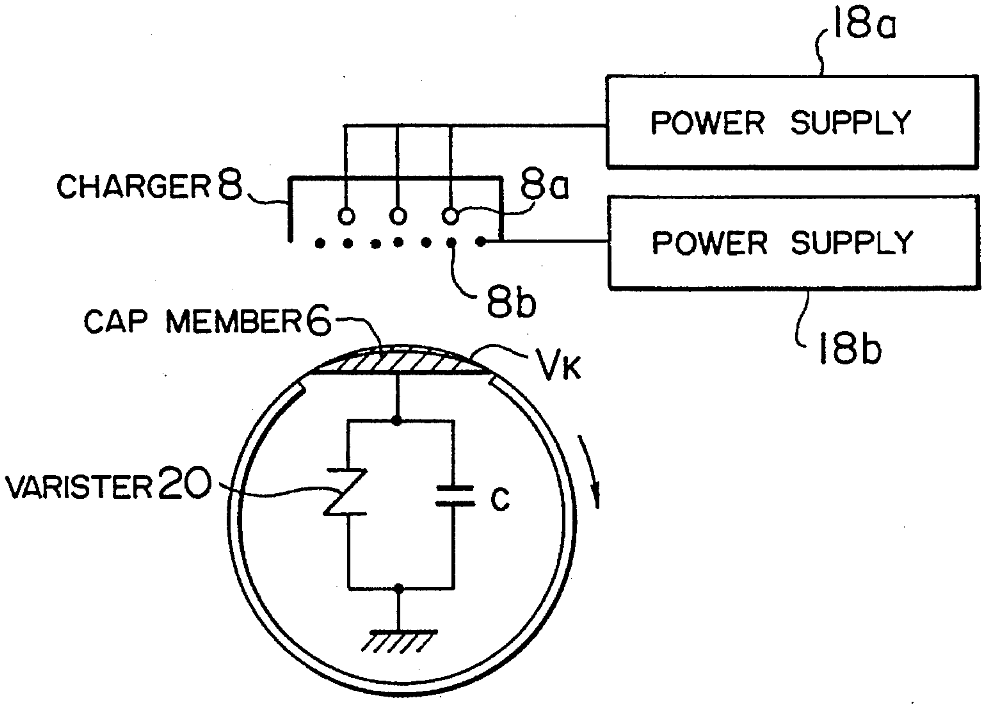
FIGS. 3A to 3K are explanatory diagrams useful to explain the reference potential measure section (cap portion) and the operation thereof in an electrostatic recording apparatus to which the present invention is applied.

In FIG. 3A, reference numeral 6 indicates a cap constituting a reference potential measure section (namely, this section is kept retained at the reference potential).

There is disposed a charger 8 as means to supply the reference potential to the cap 6 without using an external direct-current power supply in this embodiment.

For the cap 6, there is disposed a varistor 20 as a voltage regulator element and a capacitor C, which are connected in parallel so as to be linked to the grounding potential. Reference numerals 18*a* and 18*b* are power supplies for the charger 8.

Figure 3B:
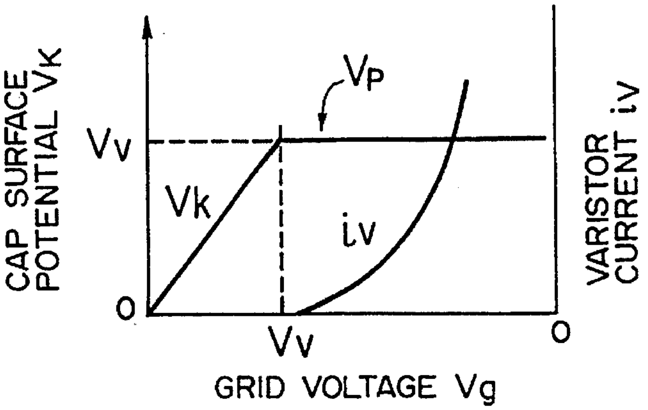

In a scorotron charger 8 disposed to oppose to and to be separated from the cap 6, when a wire voltage $V_c$ of a discharge wire 8*a* or a grid voltage $V_g$ of a grid 8*b* is increased, a surface potential $V_k$ of the surface of the cap 6 is changed as shown in FIG. 3B. In this diagram, $V_V$ stands for an operation potential (varistor voltage) of the varistor 20 and $i_V$ is a varistor current.

As can be seen from FIG. 3B, the surface potential $V_k$ of the cap 6 increases when the grid voltage $V_g$ becomes to be greater; and when $V_k$ reaches the operation potential $V_V$ of the varistor 20, the value of $V_k$ is saturated and then the varistor current $i_V$ starts increasing.

In this fashion, the surface voltage of the cap 6 constituting the reference potential measure section is kept retained at a potential $V_V$.

Figure 3C:
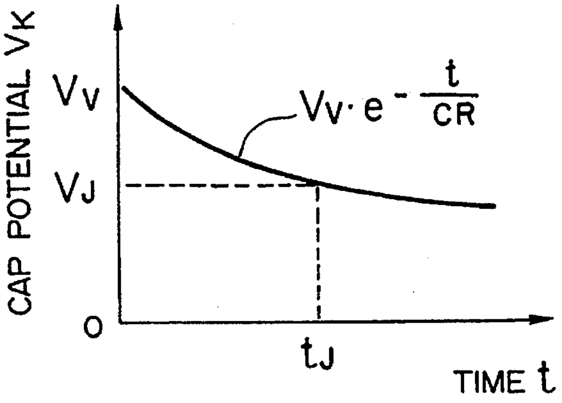

FIG. 3C is a graph showing a variation with respect to time in the cap surface potential $V_k$ after the cap 6 passes a position below the charger 8. As shown here, the potential $V_k$ is lowered in association with a time constant of C and R, where R is a resistance of the varistor 20.

In a case where the develop method is of a normal development, if the potential of the cap 6 is set to a value lower than a development bias potential when the cap 6 passes the developer 10 of FIG. 1A, the toner does not fix thereonto.

Also in a case where a reference potential section other than the cap is disposed, it is only necessary to set the potential of the reference potential section to be lower than the bias potential.

In addition, in a case of a reverse development, the potential of the reference potential section need only be set to be higher than the bias potential so as to prevent the toner from fixing thereonto. The potential $V_J$ at a point of time when the cap 6 passes a position below the surface potential detect means (FIG. 1A) is expressed as follows.

$$V_J = V_V \cdot e^{-\frac{t}{C \cdot R}}$$

In consequence, in order to set the potential of the charge receiving surface of the photoresistive body to the reference potential $V_S$, it is only necessary to select for use a varistor having an operation voltage $V_V$ as follows.

$$V_V = V_S \cdot e^{\frac{t}{CR}}$$

As a result, when the cap passes a position below the surface potential detect means, the potential $V_k$ of the cap is lower than $V_S$. As described above, by using the varistor, C, and R, the usage of another external power source is unnecessitated. In order to effect a direct power supply from an external power source, there is required a slip ring mechanism, which is also unnecessary in the system according to the present invention. In this manner, according to the present invention, there is implemented a simple method and there is not required any additional power source, and hence a compact system can be configured at a low cost.

Figure 3D:
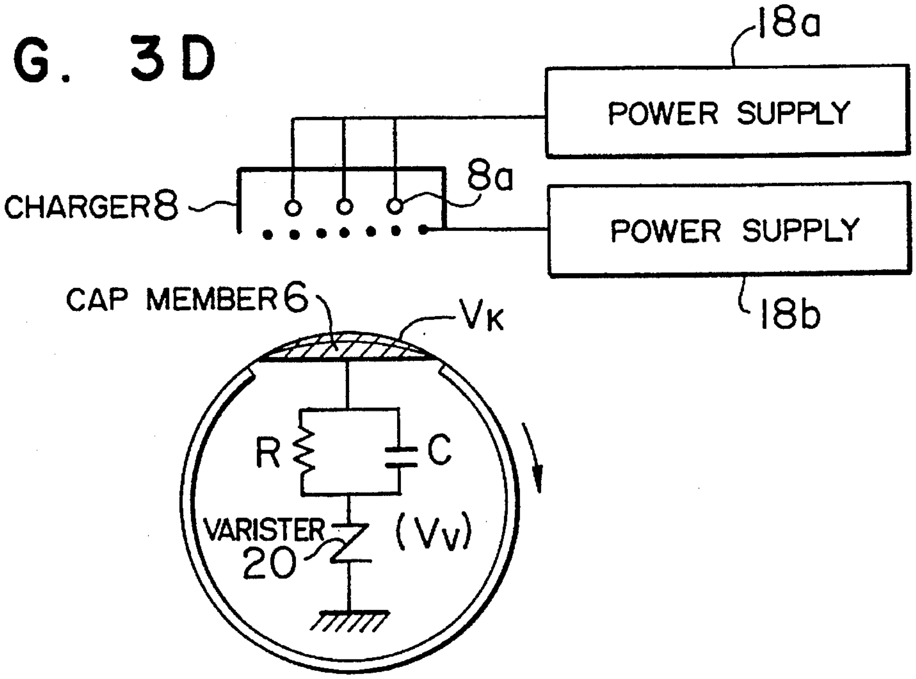

As shown in FIG. 3D, in addition to a parallel connection of the capacitor C and the fixed resistor R, the varistor 20 is further connected in series so as to link the cap 6 to the ground potential, which also leads to the similar operation and effect.

Further, by using a Zener diode in place of the varistor 20, the similar operation and effect can be developed. In short, it is possible to select for use an appropriate one of voltage regulator elements.

Figure 3E:
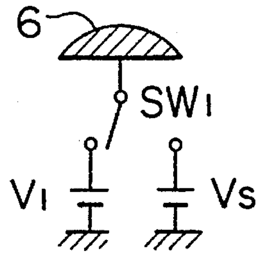
Figure 3F:
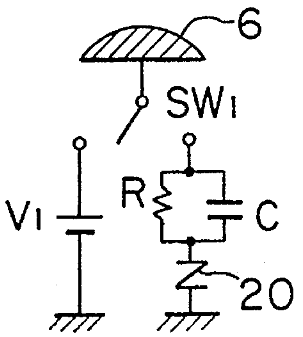
Figure 3G:
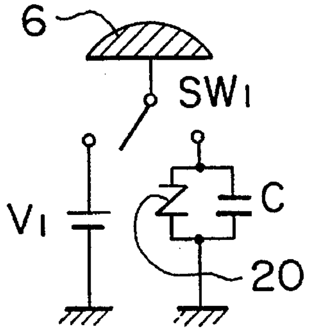
Figure 3H:
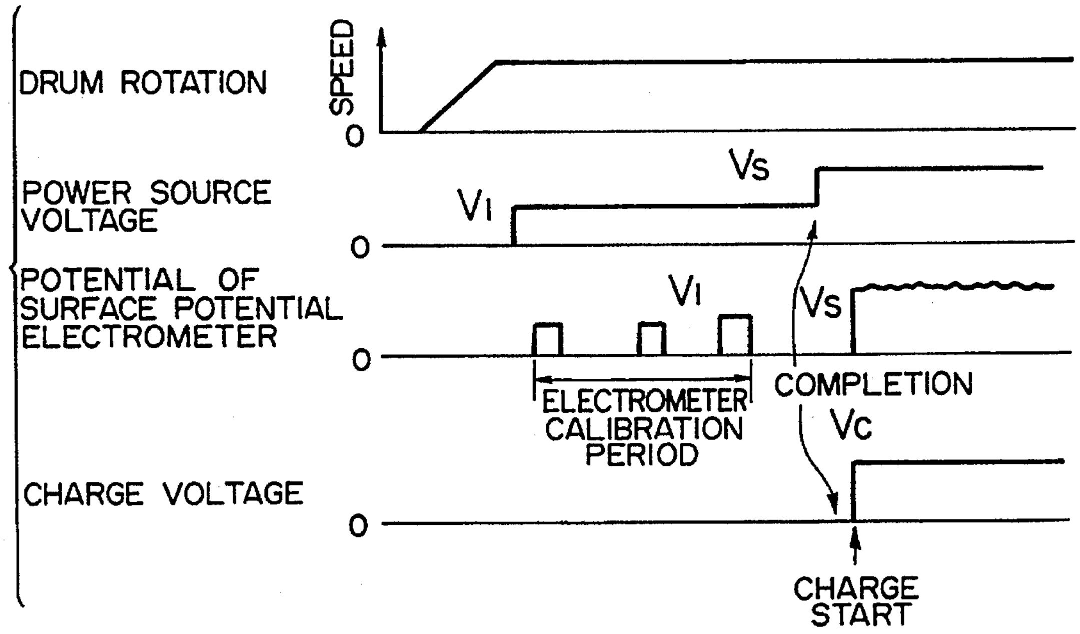

FIGS. 3E, 3F, and 3G show other embodiments of the cap 6 wherein there is shown a method to be employed in an external power source to supply a potential to the cap 6. As shown in FIG. 3E, the cap 6 is constituted so as to be applied with two kinds of voltages depending on a change-over operation of a switch $SW_1$, where $V_1$ is a calibration voltage and $V_S$ stands for a receive voltage on the charge receiving surface. FIG. 3H shows an example of an operation timing chart in a case where after the surface electrometer or surface potential detect means 7 is calibrated, the surface of the photoconductive body is uniformly charged up with electricity. That is, first after the drum rotary speed is set to a constant value, the power source voltage $V_1$ is connected to the cap 6, which accordingly causes the cap potential to be set to the calibration voltage $V_1$. In this state, the surface electrometer 7 measures the cap potential so as to calibrate the surface electrometer 7 to indicate a voltage value $V_1$. When the calibration is finished, the switch is changed over so as to set the cap potential to $V_S$. Subsequently, the operation of the charger 8 is started. The charger 8 is controlled to keep the indication $V_S$ in the electrometer 7 of the photoconductive surface. As a result, the electrometer 7 can be correctly calibrated. In this case, although two units of external power sources are required, as shown in FIGS. 3F and 3G, the configuration on the $V_S$ side may be set to be same as that of FIGS. 3D and 3A, respectively. In this situation, the number of external power sources can be reduced to one.

Figure 3I:
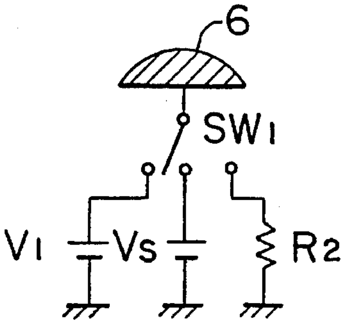
Figure 3J:
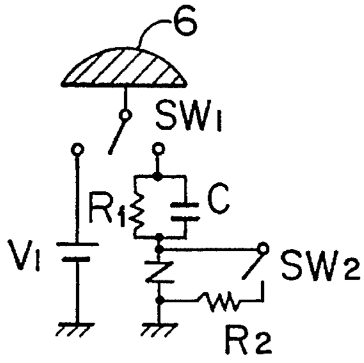
Figure 3K:
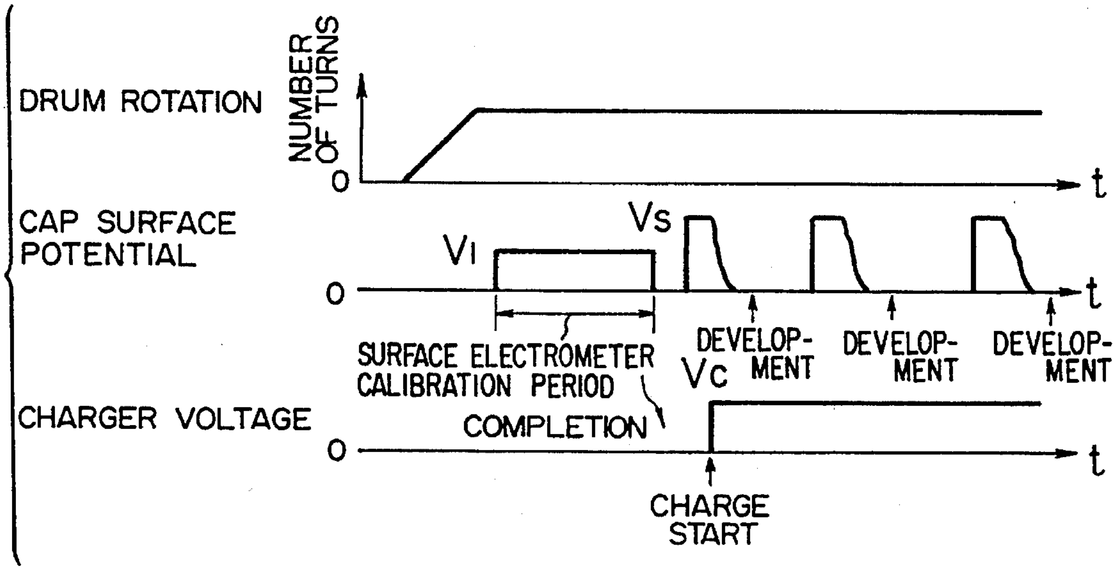

Description has been given of a case of the reverse development with reference to FIGS. 3A to 3K. In this configuration, it is necessary that the potential of the cap 6 is kept at a value sufficiently higher than the developer bias voltage when the cap 6 passes the developer 10 so as to prevent the toner from fixing thereonto. In contrast, in a case of the normal development, it is necessary that the potential of the cap 6 is kept at a value sufficiently lower than the developer bias voltage when the cap 6 passes the developer 10. FIGS. 3I and 3J show power source systems to be connected to the cap 6 in the case of the normal development. FIG. 3I is associated with a case where the cap potential is entirely supplied from an external power source, where $V_1$ is a calibration voltage, $V_S$ is used to supply a reference potential to control the surface potential of the charge receiving surface, and $R_2$ indicates a current control resistor to decrease the cap potential to the ground potential. FIG. 3K shows an operation timing chart in which the potential of the cap 6 is first set to $V_1$ so as to measure the surface potential of the cap 6, thereby calibrating the surface electrometer. After the calibration is completed, the potential of the cap 6 is set to $V_S$ and then the charger 8 is initiated such that the surface potential of the charge receiving surface after the charge operation is detected by use of the surface electrometer so as to control the charger 8 to obtain a detected value $V_S$. That is, the charger voltage $V_C$, the grid voltage $V_G$, or the corona current undergoes a change. Thereafter, the potential of the cap 6 is grounded through a resistance so as to be lower than the bias voltage of the developer 10 and then the cap 6 is passed below the developer 10. Subsequently, this operation is repeatedly effected.

In FIG. 3J, in place of the power source $V_S$ of FIG. 3I, there are employed a resistor $R_1$, a capacitor C, a varistor and a switch $SW_2$, which enables an external power source to be removed.

Figure 4A:
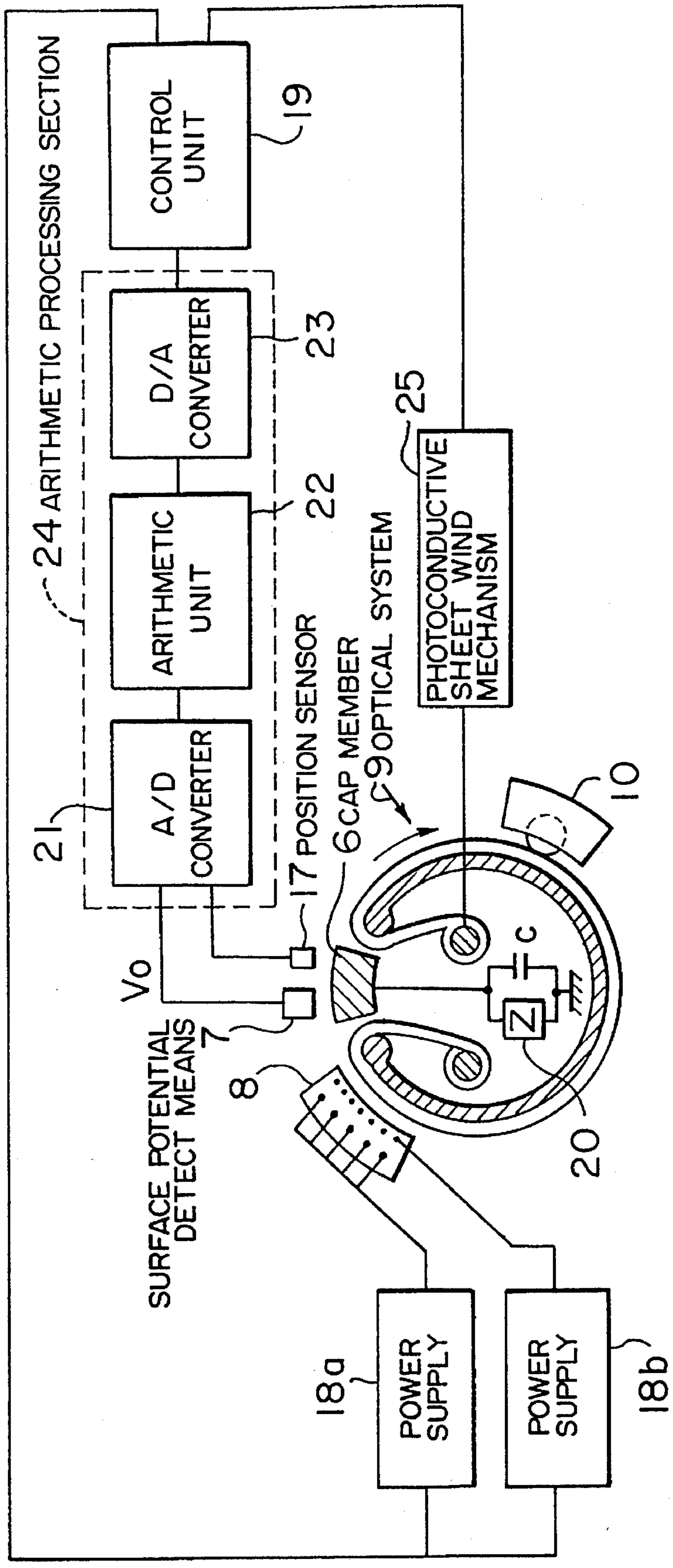
FIGS. 4A and 4B are schematic diagrams showing a system configuration of an electrostatic recording apparatus to which the present invention is applied including a constitution of a photoconductive sheet replace system based on a surface potential control and a life evaluation of the photoconductive body surface.
Figure 4B:
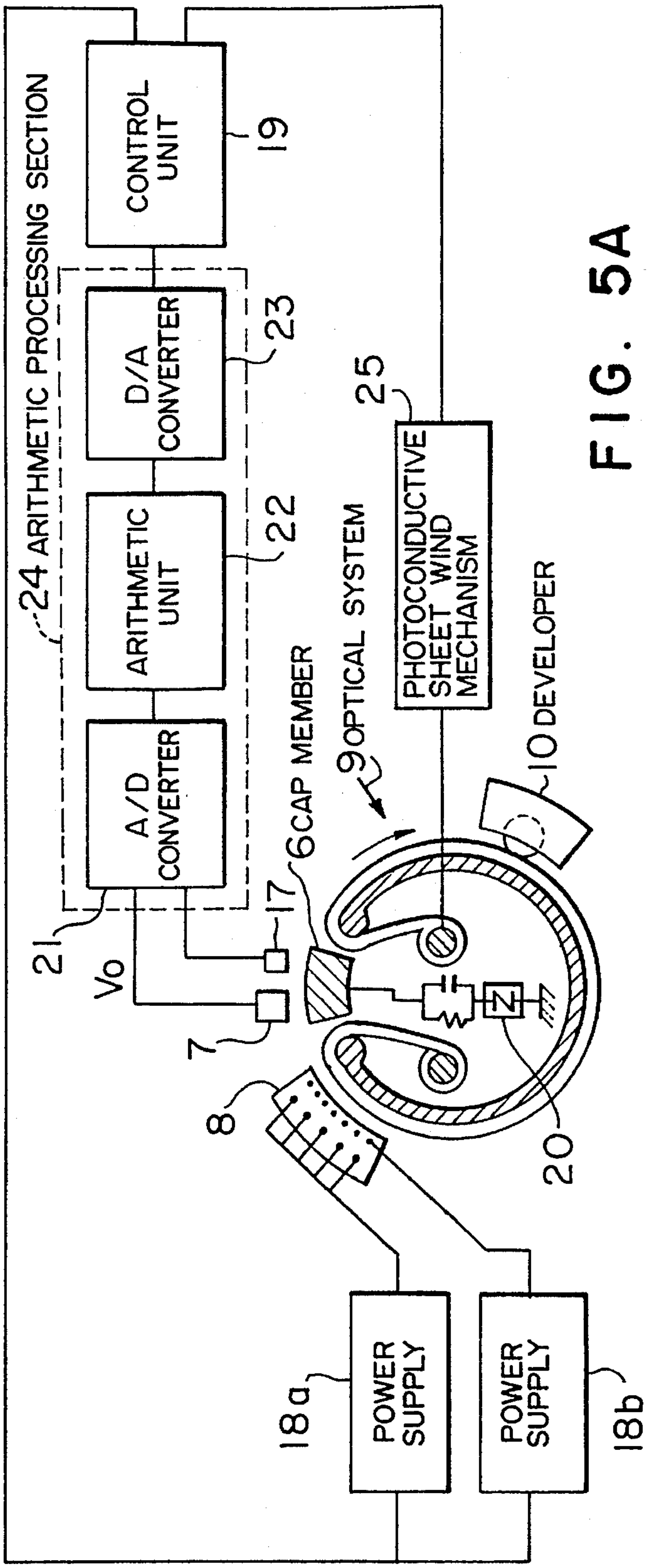

FIGS. 4A and 4B show photoconductive sheet replace systems operating based on the surface potential control of the photoconductive body and the life evaluation thereof in a method to which the present invention is applied.

FIG. 4A shows an electrostatic recording apparatus in which a varistor circuit corresponding to FIG. 3A is disposed, whereas FIG. 4B shows an electrostatic recording apparatus in which a varistor circuit corresponding to FIG. 3D is disposed.

As described with reference to FIGS. 3A to 3K, the reference potential $V_S$ of the charge receiving surface of the photoconductive body is applied from the charger 8 to the cap 6.

The operation is effected as follows.

(i) The position sensor 17 detects a position of the cap (reference potential measure section), and the value (which is not necessarily an absolute value) measured at this point of time by the surface potential detect means 7 is inputted as the reference voltage $V_S$ of the charge receiving surface to an arithmetic processing section 24. In the operation to measure the cap surface potential, in order to avoid an effect, for example, of a gap between the cap and the photoconductive sheet, there may be employed a method in which the measured value obtained at the center of the cap is supplied as the reference potential to the arithmetic processing section. Reference numerals 21, 22, and 23 indicate an analog-to-digital (A/D) converter, an arithmetic unit, and a digital-to-analog (D/A) converter, respectively. The arithmetic unit includes a central processing unit (CPU), a random access memory (RAM), a read-only memory (ROM), and the like.

(ii) The surface potential detect means measures the surface potential $V_O$ of the charge receiving surface so as to supply the arithmetic processing section 24 with the potential $V_O$, which is then compared with the reference voltage $V_S$ of the charge receiving surface previously inputted in the step (i).

Based on the comparison result, the control circuit 19 controls the charger power supplies 18*a* and 18*b* such that, as shown in FIG. 2, the control is effected on the surface potential so as to set the charge receiving surface potential $V_O$ to be substantially identical to $V_S$ in the next cycle.

As a method of controlling the charger power source, the control may be effected on the grid voltage $V_g$ of the grid 8*b*, the wire voltage $V_c$ of the discharge wire 8*a*, or the corona current.

(iii) In a case where the charge receiving surface potential cannot reach the present value (including $V_S$) even when the voltage and current of the charger are increased due to the deterioration of the photoconductive body, it is to be judged that the end of life of the photoconductive body is detected, so that the photoconductive sheet is drawn out by use of the photoconductive sheet wind mechanism 25. As the parameters to evaluate the life of the photoconductive body, there may also be employed, in addition to the potential (absolute value) of the charge receiving surface, the varying value of the surface potential.

(iv) When the electrostatic recording apparatus is in the halt or inoperative state, the photoconductive body is in the stationary condition. In this state, when a measurement electrode of the surface potential detect means 7 is located to oppose the charge receiving surface of the photoconductive body, the residual potential (100 to 200 V) causes a dc voltage to appear, which influences the measurement electrode of the surface potential detect means 7. (For example, an adverse influence is exerted on a charge-up operation.) In order to overcome this difficulty, when the photoconductive body is stationary, the surface potential detect means 7 is caused to oppose the cap 6 so as to set the potential of the cap 6 to zero.

As shown in FIG. 4A, in a case where there is disposed a constant-voltage circuit including a capacitor C and a varistor 20 and in a case as shown in FIG. 4B where a fixed resistor is combined therewith to form a constant-voltage circuit, if the characteristic values of these electric parts are appropriately selected, the voltage can be set to substantially zero volts within several seconds after the photoconductive body is stopped. As a result, there may be avoided the adverse influence on the charge-up operation of the surface potential detect means 7. In addition, the electric field in the vicinity of the surface potential detect means 7 is also removed, which solves the problem that the toner is dispersed so as to be fixed onto the measure electrode of the surface potential detect means and causes a failure thereof.

Furthermore, during the halt state or inoperative state of the electrostatic recording apparatus, it is possible to achieve a zero-point correction on the surface potential detect means 7.

Figure 5A:
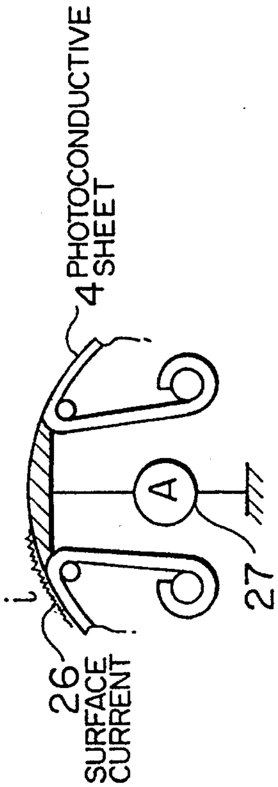
FIGS. 5A and 5B are diagrams schematically showing another embodiment in which a life evaluation is conducted depending on the surface current control of the photoconductive body after the charging operation with respect to the surface potential control of FIGS. 4A and 4B.

FIG. 5A is an explanatory diagram useful to explain another method of evaluating the life of the photoconductive body.

When the photoconductive body undergoes a long-term operation, there appears wear as described above. In particular, when the surface is damaged so as to form a defect, the value of resistance is greatly lowered (1/100 to 1/1000 of the initial value) in a humid location. As a result, there occurs a deformation of an image, which leads to a deterioration of the picture quality.

Based on the aspect above, also by measuring the surface current of the photoconductive body after the charge operation, the life (the wear state) of the photoconductive body can be evaluated.

In order to apply this method to a practical case, the cap 6 is formed with an electric conductor so as to connect the conductor to the surface of the photoconductive body. In this case, it is desirable that an end portion of the cap 6 is constituted with a conductive rubber or the like so as not to damage the surface of the photoconductive body.

Figure 5B:
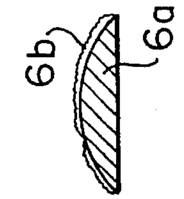

FIG. 5B shows a configuration example of the cap 6. In the foregoing description, although the material of the cap 6 has not been particularly described, the cap 6 may be formed with a metal material such as aluminum in a case where the transcribe method is associated with the corona transcriber. However, in the case of a roller transcribe operation, since a rubber material is generally employed for the roller, if the metal cap portion is kept brought into contact with the roller, there exists a possibility that the rubber roller is worn. In this situation, it is desirable to dispose a soft cap. That is, the cap is favorably made of a conductive rubber or a conductive rubber film 6*b* is desirably formed on a metal material 6*a*. In addition, a conductive resin may be employed in place of the conductive rubber.

An ammeter 27 is connected between the cap 6 and the ground potential so as to detect a leakage current 26.

This current is monitored such that when the current value exceeds a predetermined value, it is assumed that the life end is found for the photoconductive body, thereby accomplishing the replacement of the photoconductive body.

Figure 9A:
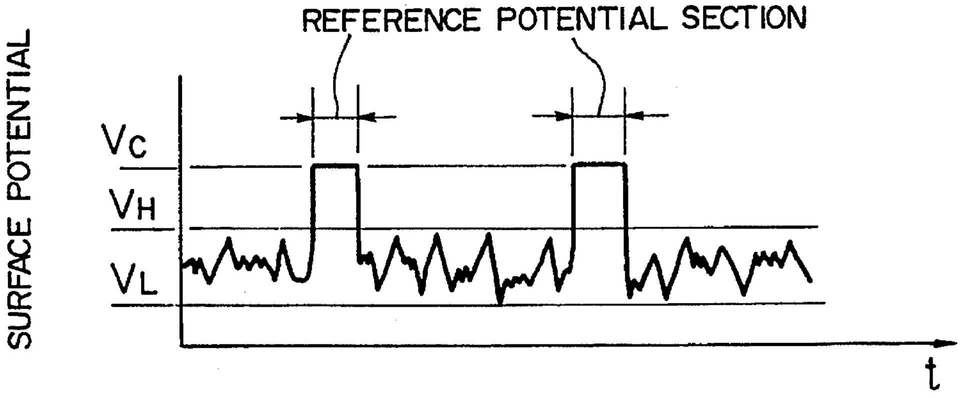
FIGS. 9A to 9C are operational diagrams showing a variation with respect to time of the measured potential of the surface potential of a photoconductive body according to the present invention.
Figure 9B:
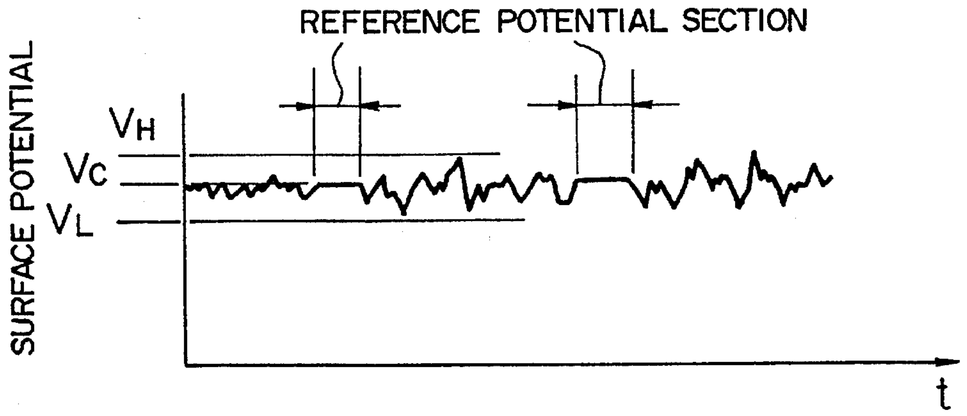
Figure 9C:
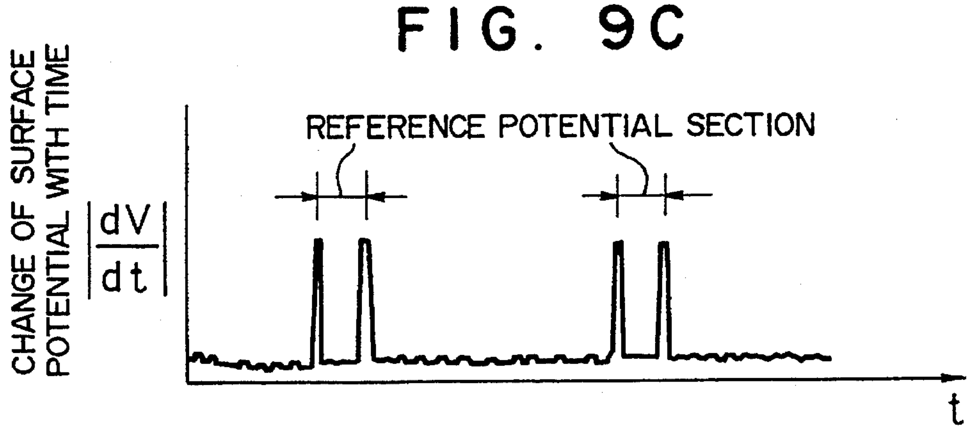

In the case where the cap 6 is either a conductive rubber or a metal, the charger control can be effected to minimize the difference between the voltages measured on the cap 6 and on the charge receiving surface by use of the surface potential detect means 7. Next, description will be given of a concrete method of controlling the charger. FIGS. 9A to 9C show variations with respect to time of the voltage measured by the surface potential detect means 7 in which the potential $V_k$ of the cap 6 is set to the voltage $V_S$ associated with the charge operation of the charge receiving surface.

In FIG. 9A, there is shown a case where the output value of the surface potential detect means 7 is less than the potential $V_k=V_C$ of the cap 6 as the reference potential measure section. In this case, it is necessary to control the charger 8 so as to increase the surface potential. As a method of increasing the potential, a control operation is carried out as shown in FIG. 9B such that the following expression is satisfied by the maximum output value $V_H$ and the minimum output value $V_L$ of the surface potential detect means 7 and the output $V_C$ of the cap 6;

$$V_C=\alpha\times(V_H-V_L)+V_L$$

where $0\leqq\alpha\leqq1$. In addition, also when the output value of the electrometer or surface potential detect means 7 is higher than the potential of the cap as the reference potential measure section, by effecting the similar control, the potential of the charge receiving surface can be set to an appropriate value.

Description will now be given of another method of controlling the charger 8. FIG. 9C shows the variation with respect to time of the signal obtained through a differentiation and rectification effected on the output value of the surface potential detect means 7. When the potential of the charge receiving surface is equal to the reference potential, the potential in a pulse shape is substantially zero; however, when the potential of the charge receiving surface is unequal to the reference potential, a pulsated voltage is generated before and after the cap 6. When the charger 8 is controlled such that the pulsated voltage is reduced to the maximum extent, the surface potential of the charge receiving surface can be set to an appropriate value.

In a case where the above control of the surface potential becomes to be impossible, it is assumed that the photoconductive body is to be replaced.

More concretely, when the difference between the maximum and minimum values exceeds a preset value, the photoconductive body is judged to be replaced.

In addition, in order to determine the end of life of the photoconductive body, it is also possible to experimentally measure the number of turns of the photoconductive body associated with the replaced timing thereof such that when the value experimentally measured is reached in the practical use of the photoconductive body, it is determined that the end of life is found.

Figure 10A:
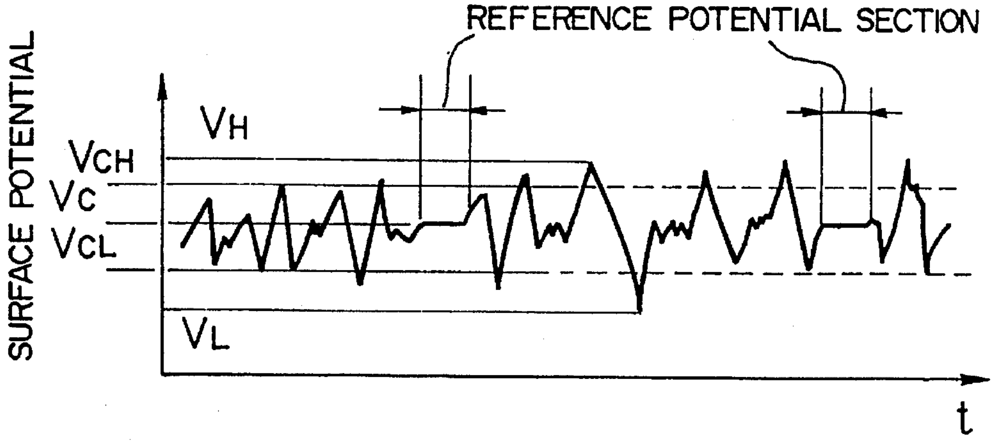
FIGS. 10A and 10B are schematic diagrams useful to explain an example of the output of the surface of a charge receiving member measured by the surface potential detect means according to the present invention.

FIG. 10A shows, like FIG. 9A, an output example of the surface potential detect means 7 associated with the charge receiving surface. According to a method of evaluating the life, when the maximum value $V_H$ and the minimum value $V_L$ satisfy the following expression, it is assumed that the end of life is found for the photoconductive body, $$(V_H-V_L)>V_D$$

where $V_D$ is a preset value.

As the second method of evaluating the life of the photoconductive body, there may be employed a procedure wherein in FIG. 10A, potential values $V_{CH}$ and $V_{CL}$ are respectively set to be the slightly higher and lower values as compared with the output from the surface potential detect means 7 associated with the reference potential measure section, and then the number $N_H$ of times when the output of the charge receiving surface exceeds $V_{CH}$ and the number $N_L$ of times when the output of the charge receiving surface is less than $V_{CL}$ are counted in the control circuit 19 of FIG. 1A, so that when the counts above associated with the photoconductive drum exceed a predetermined count $N_G$, it is assumed that the end of life is found for the photoconductive body.

Figure 10B:
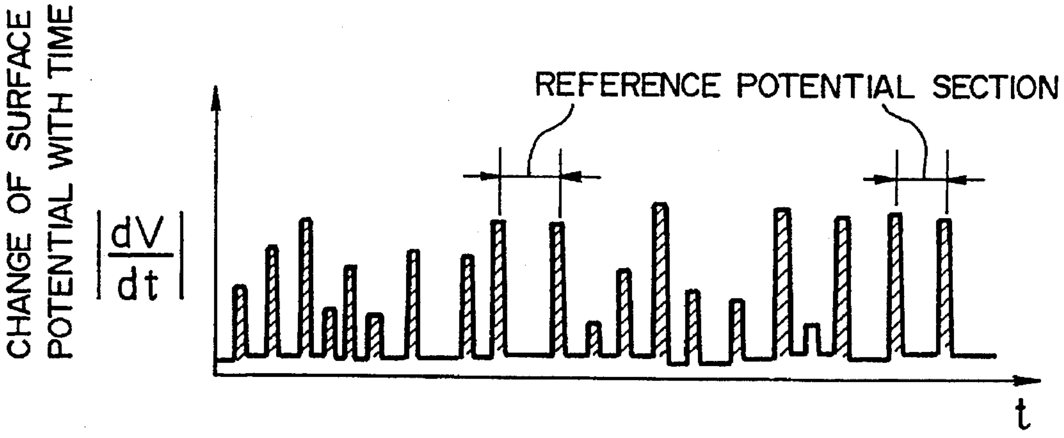

In the method of evaluating the life of the photoconductive body of this example, there is utilized a waveform obtained by differentiating the measured potential. FIG. 10B shows a variation with respect to time of the values attained by differentiating the output from the electrometer or surface potential detect means 7 in a case where the photoconductive body is deteriorated. Through the differentiation processing, a location where the surface potential abruptly decreases can be detected; in consequence, it is possible to recognize fatal defects such as a pinhole. That is, when the surface of the photoconductive body becomes to be more deteriorated, there appear a greater number of pulse waveforms. Among these waveforms, the system monitors the number of pulses other than those associated with the reference potential measure section or the peak values of the pulses. When the number of pulses thus monitored exceeds a predetermined value $N_W$ or when the difference between the maximum and minimum values of the pulse peak values exceeds a reference value $V_W$, it is judged that the end of life is found for the photoconductive body.

Figure 6A:
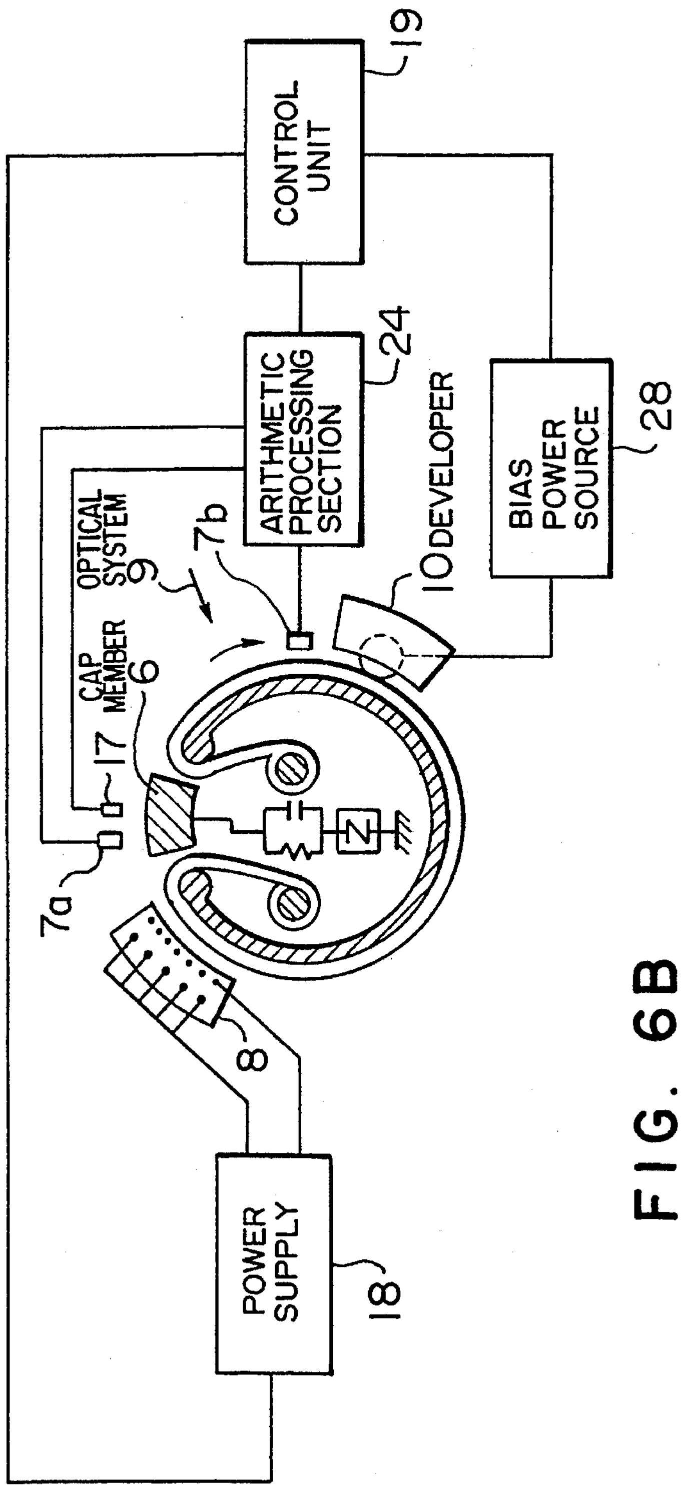
FIGS. 6A and 6B are diagrams showing a control system in which the residual voltage of the photoconductive body after the exposure is measured to effect a high picture quality control and a life evaluation of the photoconductive body in FIGS. 4A and 4B.
Figure 6B:
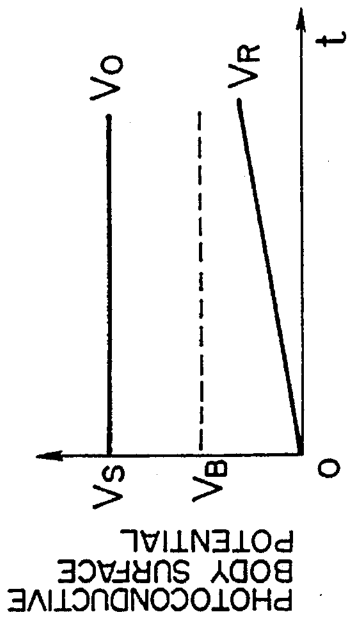

FIGS. 6A and 6B show another embodiment according to the present invention including a second surface potential detect means 7*b* to measure the surface potential after the exposure so as to obtain a residual potential $V_R$.

The surface potential detect means 7*a* is employed to comparatively measure the potential of the cap 6 and the surface potential of the charge receiving surface after the charge operation, and as described with reference to FIGS. 4A and 4B, the charger 8 is controlled such that the surface potential of the charge receiving surface is kept retained at the reference value $V_S$ in any situation.

However, as shown in FIG. 6B, the surface potential after the exposure effected by the optical system 9, namely, the residual potential $V_R$ increases with a lapse of time (as the value t increases along the abscissa), even for the same amount of exposure, because of the deterioration of the photoconductive body.

The residual potential $V_R$ is measured by the second surface potential detect means 7*b* so as to be compared with $V_O$, which is measured by the first surface potential detect means 79, by use of the arithmetic processing section 24 such that the controller 19 controls the bias power source 28 of the developer 10 so as to set the bias voltage $V_B$ to a value less than $V_O$ and greater than $V_R$. As a result, there does not appear the fog in the obtained picture.

On the other hand, based on $V_O$ and $V_R$, a contrast potential $\Delta V$ is computed as the difference between $V_O$ and $V_R$ such that when this value $\Delta V$ becomes to be less than a preset value or when $V_R$ becomes to be greater than a predetermined value, the end of life of the photoconductive body is assumed and then the photoconductive body sheet is to be replaced.

According to this method, since the characteristic of the photoconductive body is evaluated also after the exposure, the life evaluation can be accomplished with a higher precision.

In the embodiment of FIGS. 6A and 6B, although there are adopted two surface potential detect means 7*a* and 7*b*, it is also possible to employ only one surface potential detect means 7*b* such that the exposure is conducted so that the bright and dark states repeatedly appear so as to measure $V_O$ in association with the surface of the photoconductive body in the dark portion and to measure $V_R$ related to the surface of the photoconductive body in the bright portion. This provision enables the object to be achieved only with one surface potential detect means.

Figure 7A:
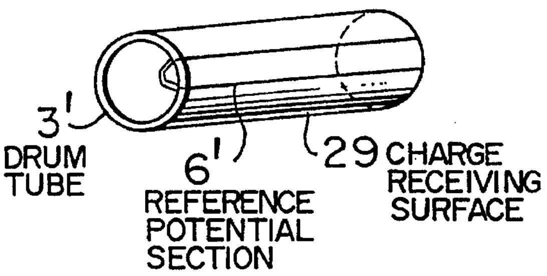
FIGS. 7A and 7B are configuration diagrams showing a photoconductive drum of an electrostatic recording apparatus to which the present invention is applied.
Figure 7B:
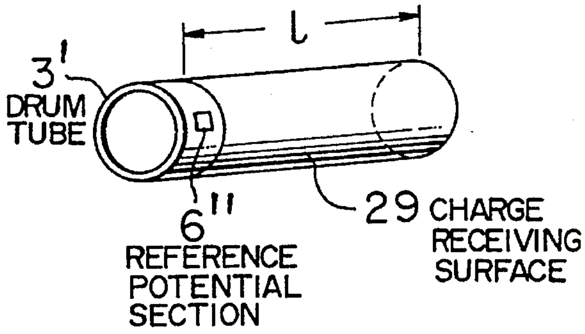

Although the embodiments above have been described with reference to an electrostatic recording apparatus employing a photoconductive body of a so-called sheet wind type in which the photoconductive body sheet 4 is rolled on the drum tube 3, the method of evaluating the life of the photoconductive body according to the present invention is not limited by those embodiments but is applicable to other systems. FIGS. 7A and 7B show examples in which the method above is applied to a system of a so-called photoconductive drum type, namely, a charge receiving surface 29 is formed on the surface of the drum tube. FIG. 7A is a case employing drum associated with a sheet of paper and is applicable when the circumferential length of the drum is longer than the width of the sheet of paper, and a reference potential section 6' is electrically insulated from a drum tube 3'. FIG. 7B shows a configuration applicable to a continuous form and to a sheet of paper in which the recording operation can be conducted on a form having a width not exceeding the length l.

Figure 8:
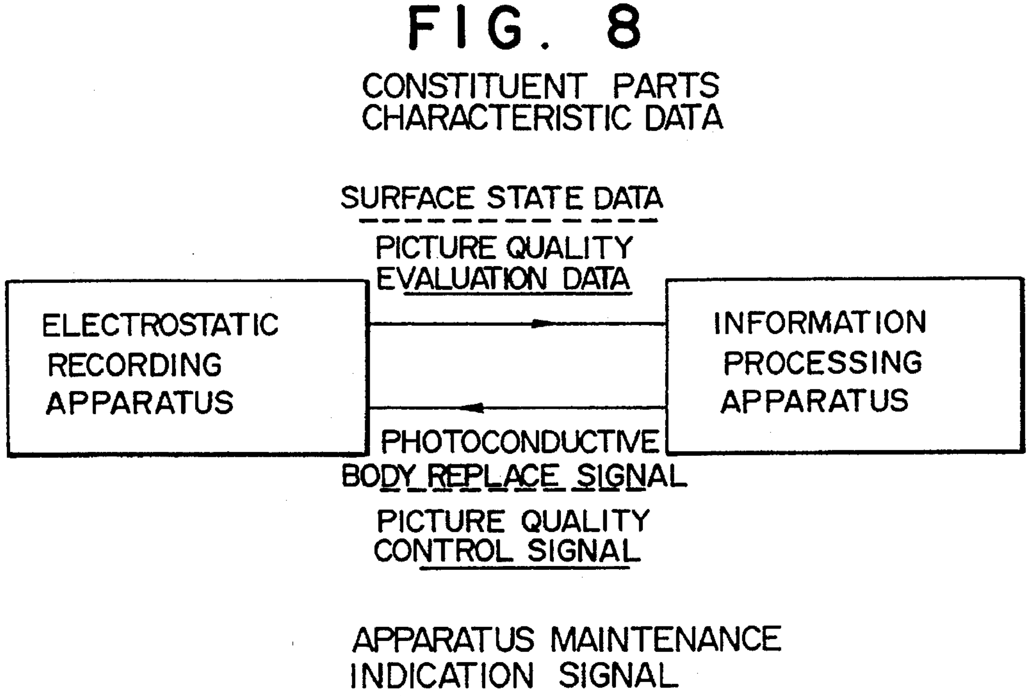
FIG. 8 is a system configuration diagram showing an information processing system employing an electrostatic recording apparatus to which the present invention is applied.

FIG. 8 is an explanatory diagram useful to explain an example in which an information processing system is constituted with an electrostatic recording apparatus to which the present invention is applied and an information processing apparatus located separately with respect to the recording apparatus.

In the embodiments described with reference to FIGS. 1A, 1B, 4A, 4B, 6A, and 6B, the operations such as the controls of the developer bias voltage and of the charger are carried out by disposing an arithmetic processing section in the electrostatic recording apparatus; however, in cases where processing such as a full color printing is achieved with a super high picture quality in association with a super high speed and super precision computer graphics, the controls are required to be effected with a higher precision. In such a case, the information processing apparatus is to control the electrostatic recording apparatus. There can be considered two methods (1) and (2) for this system as follows.

(1) Evaluation of Life of Photoconductive Body and Replacement of Photoconductive Drum Data indicating the surface state of the photoconductive body is sent from the electrostatic recording apparatus to the information processing apparatus to be processed therein, so that when the end of life is found as a result of the data processing, a photoconductive body replace signal is supplied from the information processing apparatus to the electrostatic recording apparatus, thereby replacing the photoconductive body in an automatic manner or manually.

(2) Picture Quality Control

An image printed out by use of the electrostatic recording apparatus is read by means of a read mechanism so as to form data therefrom such that the data is sent to the information processing apparatus, which in turn effects a data processing thereon and then transmits picture quality control signals indicating the charged amount, the exposure amount, and the development condition to the electrostatic recording apparatus, thereby achieving the picture quality control.

In addition, it is also effective that the information processing apparatus is used to accomplish a failure diagnosis and a defect preventive operation on the electrostatic recording apparatus. That is, the electrostatic recording apparatus supplies the information processing apparatus with characteristic data of the constituent parts such as the wire of the charger, the exposure power, the developer, the heat roll, and the erase lamp such that the data is compared with the life judge data related to the respective constituent parts so as to generate an apparatus inspection indication signal. With this provision, it is possible to beforehand prevent a failure from occurring in the electrostatic recording apparatus.

According to the present invention, the following effects are obtained.

(1) Since the reference potential measure section keeping a predetermined potential is formed in a portion of the area on the surface of the photoconductive drum, the surface potential of the charge receiving surface (photoconductive body) can be controlled through a potential comparison between the reference potential measure section and the charge receiving surface. In consequence, the calibration need not be continually accomplished on the surface potential detect means; furthermore, the surface potential can be simply controlled with quite a high precision.

(2) Since a local variation of the potential on the photoconductive body after the charge operation can be measured with a high precision, it is possible to evaluate the life of the photoconductive body in association with the deterioration of the surface thereof and hence to determine the timing of the replacement of the photoconductive body.

(3) The potential of the reference potential measure section can be appropriately set; in consequence, it is possible, when this portion passes the developer, to easily prevent the toner from fixing thereonto, namely, to prevent the toner from being transcribed onto an area where the toner is not required.

(4) On the photoconductive drum, there is disposed the reference potential measure section having a predetermined potential, and hence the surface potential detect means can be easily calibrated without necessitating an operation to move the surface potential detect means from the photoconductive drum.

In addition, the following effects are developed by adopting the method of evaluating the life of the photoconductive body according to the present invention.

(5) Since the reference potential measure section having a predetermined potential is formed in a portion of the photoconductive body, it is possible, without necessitating an operation to recognize the absolute value of the surface potential of the charge receiving surface (the photoconductive surface as an evaluation object), to evaluate the life depending on the compared value related to the reference potential measure section. In consequence, without necessitating the calibration of the surface potential detect means, the surface potential can be controlled with a high precision.

(6) The variation in the charged potential of the photoconductive body, the residual potential thereof, and the surface current thereof can be measured with a high accuracy; and hence, based on the results of the measurements, the life of the photoconductive body can be easily evaluated with a high precision.

(7) On the photoconductive drum, there is disposed the reference potential measure section having a predetermined potential, and hence the surface potential detect means can be easily calibrated without necessitating an operation to move the surface potential detect means from the photoconductive drum.

(8) The electrostatic recording apparatus according to the present invention is suitable in a case where an information processing system including a combination of the recording apparatus and an information processing apparatus is to be configured. In consequence, it is possible to accomplish the life evaluation of the photoconductive body, the picture quality control, and the failure diagnosis of the electrostatic recording apparatus.

While particular embodiments of the invention have been shown and described, it will be obvious to those skilled in the art that various changes and modifications may be made without departing from the present invention in its broader aspects.

We claim:

1. A device for detecting a defect in a photoconductive body, comprising:

applying means for applying an electrical charge to said photoconductive body;

moving means for moving said photoconductive body;

position detecting means for detecting a position of a surface of said photoconductive body;

surface potential detecting means for detecting a surface potential of said photoconductive body;

arithmetic operation means for performing differentiation processing of said surface potential of said photoconductive body detected by said surface potential detecting means; and diagnosis means responsive to said arithmetic operation means, for evaluating a defect in said photoconductive body, based on a result of said differentiation processing.

2. A defect detecting device according to claim 1, wherein a position of a defect in said photoconductive body is detected based on a position of occurrence of a pulse generated by said arithmetic operation means.

3. A defect detecting device according to claim 1, wherein said diagnosis means evaluates a defect in said photoconductive body, based on a number of pulses and peak values of the pulses generated by said arithmetic operation means.

4. A defect detecting device according to claim 1, further comprising monitor means for monitoring a number of pulses and peak values of the pulses generated by said arithmetic operation means.

5. A defect detecting device according to claim 1, wherein a defect to be detected includes a pinhole.

6. An electrostatic recording apparatus including a photoconductive body defect detecting device according to claim 1.

7. A defect detecting device according to claim 2, wherein a defect to be detected includes a pinhole.

8. A defect detecting device according to claim 3, wherein a number of defects in said photoconductive body are detected based on a number of pulses and peak values of the pulses generated by said arithmetic operation means.

9. A defect detecting device according to claim 8, wherein a defect to be detected includes a pinhole.

10. A method according to claim 1, further comprising the step of utilizing said photoconductive body in an electrostatic recording process.

11. A method for detecting a defect in a photoconductive body, comprising the steps of:

moving said photoconductive body;

applying an electrical charge to said photoconductive body;

detecting a position of a surface of said photoconductive body;

detecting a surface potential of said photoconductive body;

performing differentiation processing of the detected surface potential of said photoconductive body; and evaluating a defect in said photoconductive body, based on a result of the differentiation processing.

12. A method according to claim 11, further comprising the step of detecting a position of a defect in said photoconductive body based on a position of occurrence of a pulse generated by arithmetic operation means performing the differentiation processing.

13. A method according to claim 11, wherein the step of evaluating a defect in said photoconductive body effects evaluation, based on a number of pulses and peak values of the pulses generated by arithmetic operation means performing the differentiation processing.

14. A method according to claim 11, further comprising the step of monitoring a number of pulses and peak values of the pulses generated by arithmetic operation means performing the differentiation processing.

15. A method according to claim 11, wherein a defect to be detected includes a pinhole.

16. A method according to claim 12, wherein a defect to be detected is a pinhole.

17. A method according to claim 13, wherein the step of detecting a number of defects in said photoconductive body based on a number of pulses generated by the arithmetic operation means for performing the differentiation processing.

18. A method according to claim 17, wherein a defect to be detected is a pinhole.

* * * * *